Sept. 20, 1932.  W. F. GROENE  1,878,130
CHUCKING DEVICE
Filed Aug. 6, 1928  4 Sheets-Sheet 3
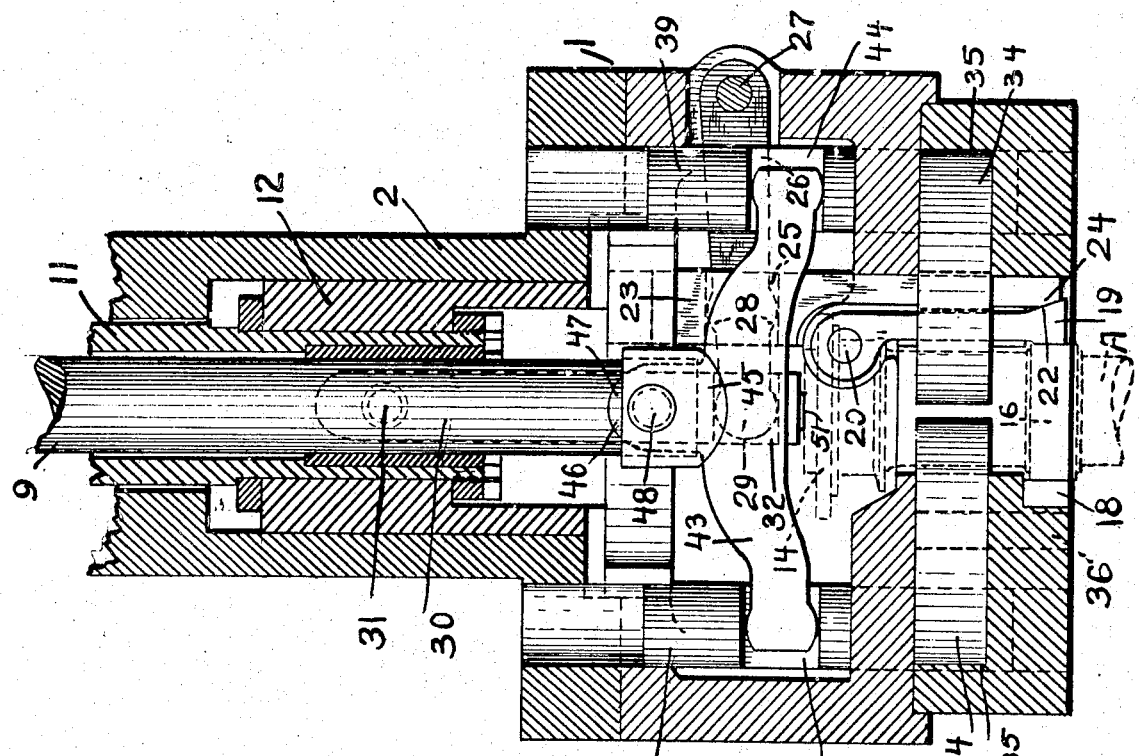
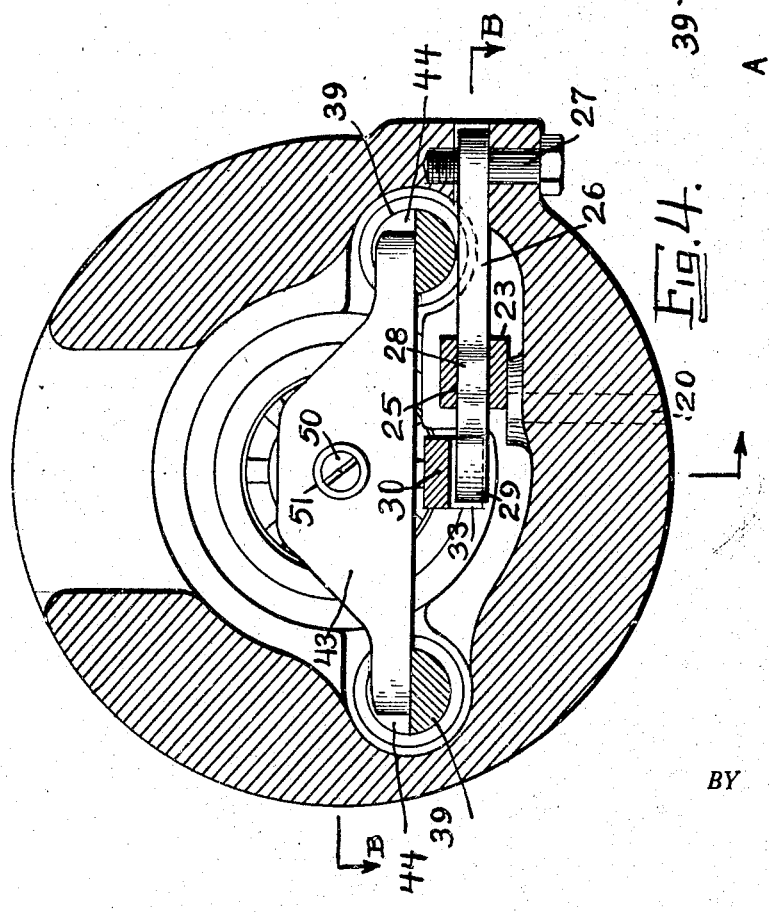
INVENTOR.
William F. Groene
BY
Allen & Allen
ATTORNEYS Sept. 20, 1932. W. F. GROENE 1,878,130
CHUCKING DEVICE
Filed Aug. 6, 1928 4 Sheets-Sheet 4
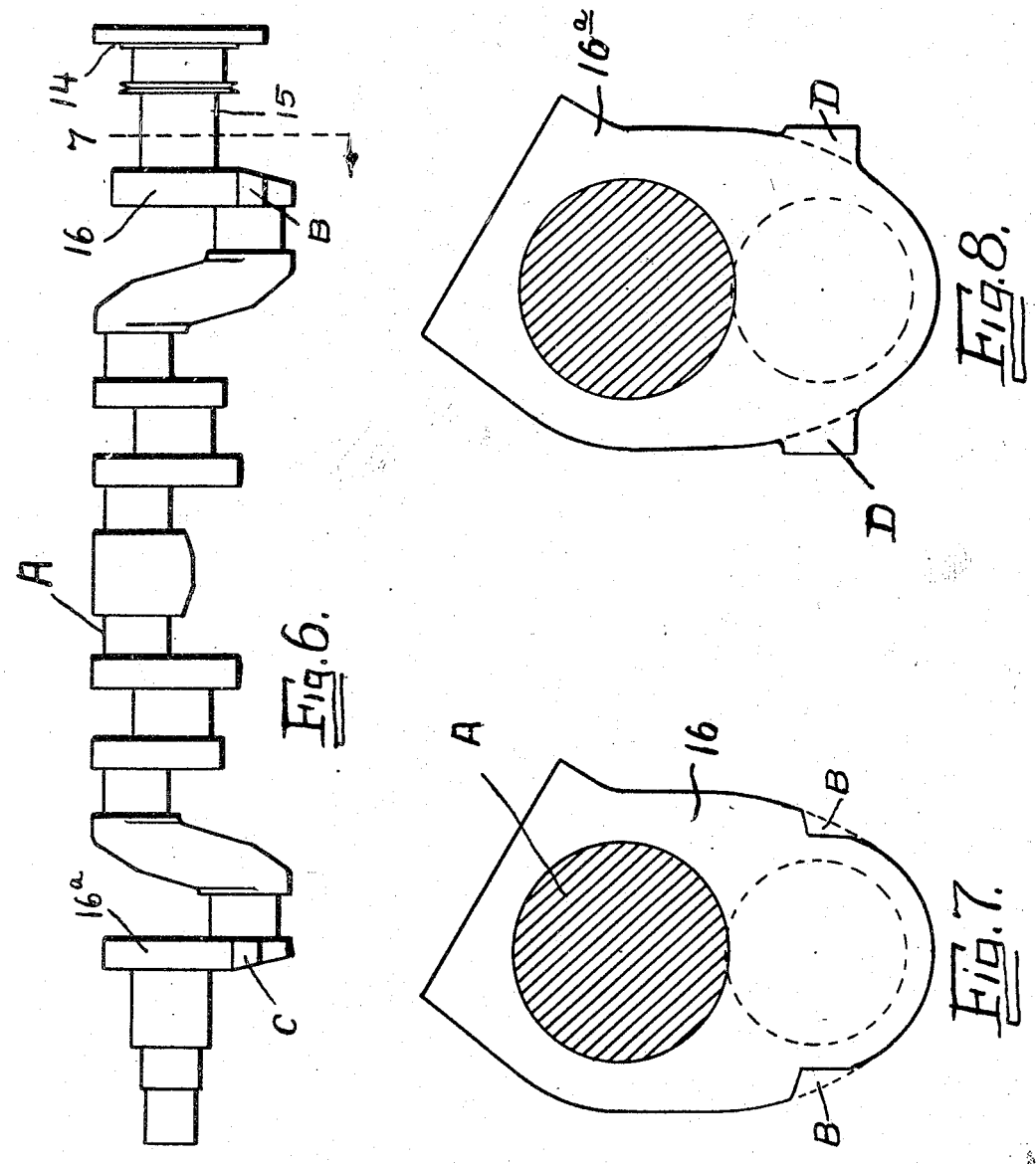
INVENTOR.
William F. Groene
BY
Allen & Allen
ATTORNEYS Patented Sept. 20, 1932

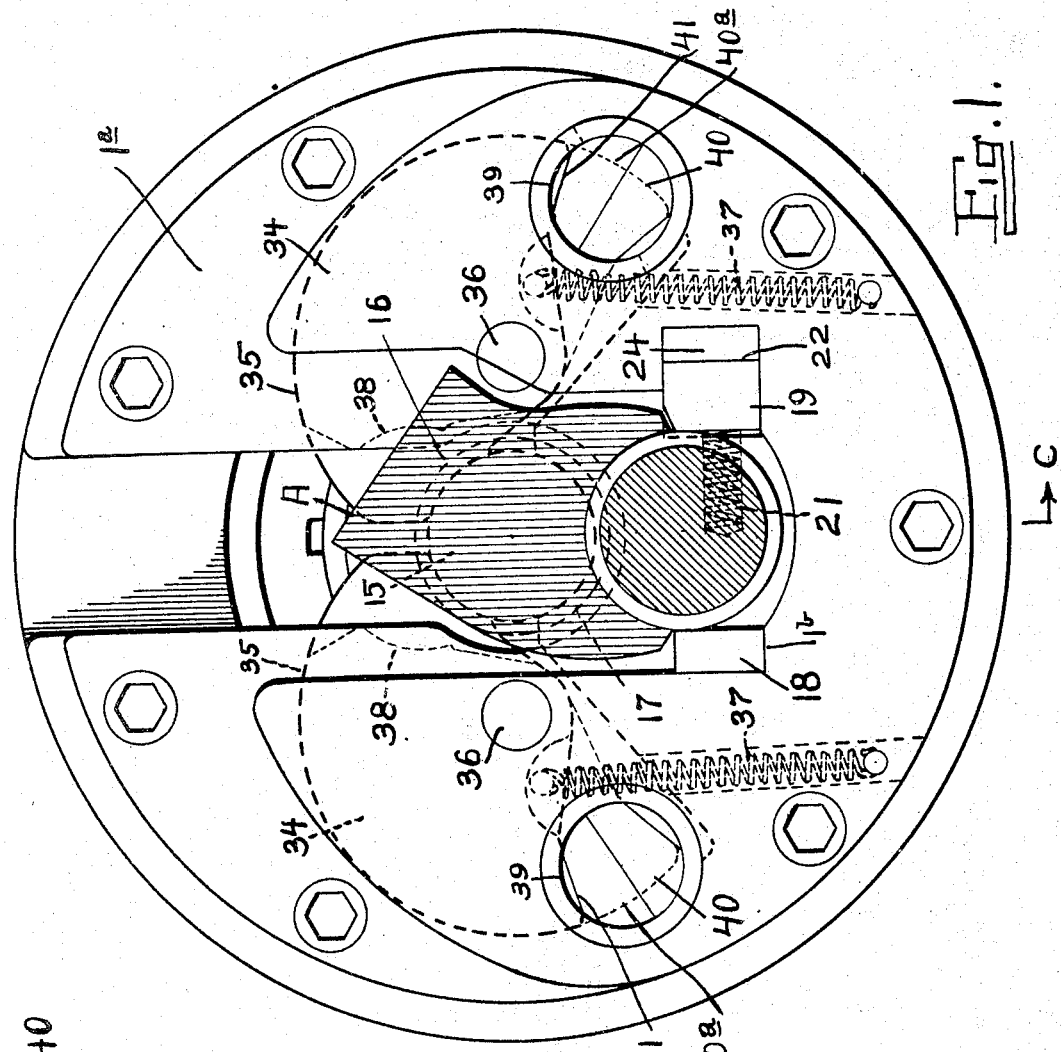
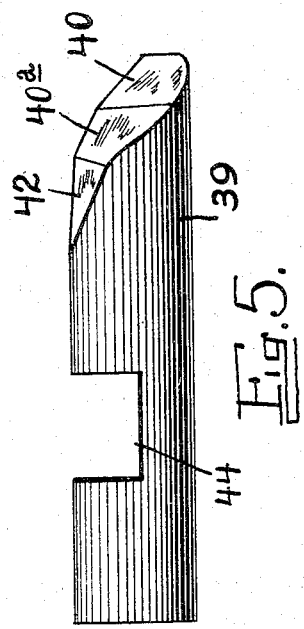

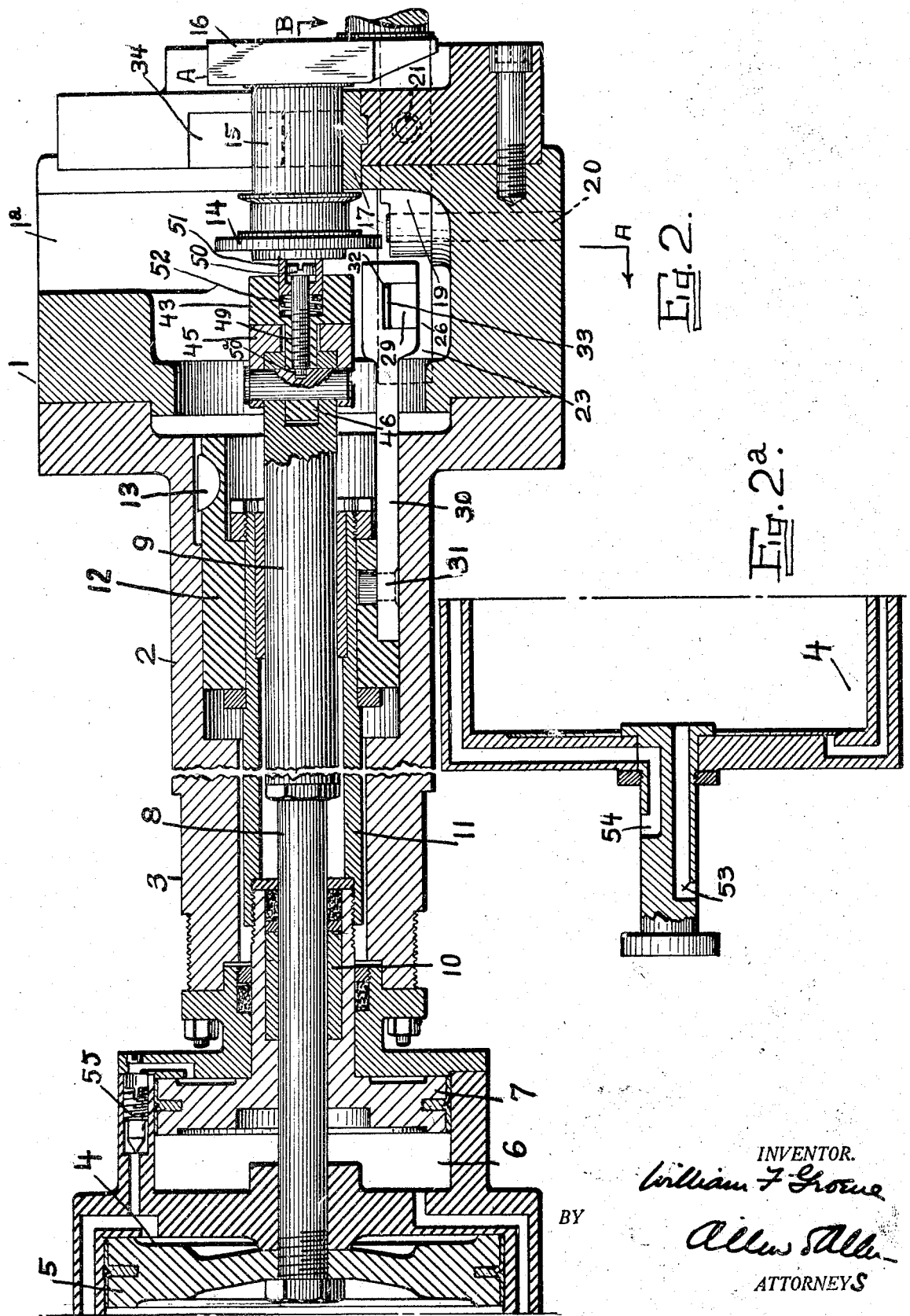

1,878,130

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

CHUCKING DEVICE

Application filed August 6, 1928. Serial No. 297,881.

REISSUED

My invention relates to chucks for crank shaft lathes, and has as its object the provision of a quick acting power operated chuck, instantaneous in its action, and serving to position and clamp the end of the crank shaft automatically and to hold it in place during the application of pressure and the relief thereof.

In applying power operated chucking jaws at both ends or at an unclamped end of a crank shaft in a lathe, a very critical situation arises when the portions of the crank shaft engaged by the jaws are out of accurate radial angle to the axis of the shaft. The result is to twist the shaft, and to hold it in twisted position during the lathe operations, so that the turning of the pins of the shaft will not be accurate, when the shaft springs back upon being released.

Among other things, my present invention contemplates the machining at both ends of the shaft of locating faces or spots, and the chucks themselves are equipped with a locating element which cooperates with a moving wedge to engage the locating faces usually on both terminal webs of the crank shaft. Also the web engaging jaws of the chucks are housed in circular walled chambers in the chuck head, forming a bearing for the jaws which are journaled therein. This provides a very strong and true acting mechanism. Also the wedging rods which operate the jaws have specially shaped faces so as to enable the wedges to move the jaws into position by a short movement and then tighten the jaws by a continued movement at a lesser wedging angle.

I accomplish my objects by that certain construction and arrangement of parts to be hereinafter more specifically pointed out and claimed.

In the drawings:—

Figure 1 is a front elevation of the air chuck.

Figure 2 is a vertical longitudinal section on line 2—2 of Figures 1 and 4.

Figure 2a is the completion of the air cylinder section at the left end of Figure 2.

Figure 3 is a horizontal longitudinal section on the line A—A of Figures 1, 2 and 4.

Figure 4 is a vertical section of the line B—B of Figures 2 and 3.

Figure 5 is a side elevation of one of the chuck jaw operating rods.

Figure 6 is a side elevation of a crank shaft.

Figures 7 and 8 are detail sections illustrating two types of locating faces taken as indicated by line 7 of Figure 6.

I have illustrated no parts of the lathe, but one of the chucks. It will be understood that like chucks may be used at both head and tail stock of the lathe.

The chuck body 1 is shown separately from its mounting and operating parts, but it will be understood that the body will be journaled at 2, and equipped with a driving gear at 3. The power means for the chuck comprises an air cylinder 4 with its piston 5, and a coaxial air cylinder 6 of smaller bore, with its piston 7. The piston rod 8 of the piston 5, extends through the piston 7, and is provided with an extension 9. The piston 7 has a tubular extension 10 which carries a gland for packing the rod 8, and a tubular piston rod 11, secured to the extension 10, surrounds the portion 9 of the inner piston rod. The portion 11 has a sleeve 12 fast thereon, which is keyed at 13 to slide in the chuck body without rotation therein.

The chuck is illustrated as in engagement with a crank shaft A (Figs. 6 and 7) having the flange end 14, a line bearing 15, and a cheek or web 16. In preparing the shaft for turning, it is placed in a milling machine, and locating faces B, B are cut in the web 16, and also in exact alignment therewith locating faces C, C are cut in the web 16 at the other end of the shaft. Instead of cutting away part of the webs, they may be made with lugs D, D thereon, as shown for the web 16a in Figure 8, and then the outer faces of the lugs are milled in perfect alignment end for end of the shaft.

In the outer end portion 1a of the chuck body which is U-shaped to permit the shaft to be dropped therein, is a hardened centering and bearing plate 17 on which the end line bearing of the crank shaft rests. Located on a ledge 1b on the body portion 1a, is a hardened abutment or locating block 18 which engages one of the locating faces on the web of the shaft. To cooperate with this fixed abutment which is arranged for the particular shaft to be employed, I provide a clamping and positioning arm 19, which is pivoted on a pin 20 in the chuck body, and pressed by a spring 21 away from engaging position. This arm has a wedge face 22, on the side of its free end part facing from the work, and its position is such that its face toward the work engages the other locating face on the shaft web.

To operate the arm 19 I employ the outer piston rod 11, and provide a sliding bar 23, which bar moves in a groove in the chuck head and has a wedge face to coact with the face 22 on the arm 19.

The bar 23 has a slot 25 therein, through which a lever 26 passes, said lever having its outer end pivoted at 27, and having an enlarged rounded middle portion 28 which engages the walls of the slot. The lever 20 has a rounded knob 29 at its inner end.

In a channel in the sleeve 12 on the outer piston rod 11, a bar 30 is mounted and pinned as at 31. The bar has a bifurcated end 32, the opening 33 of which engages over the knob 29.

When, then, the piston 7 is moved to right or left, the tubular rod 11, through the medium of the sleeve thereon, reciprocates the bar 30. The bar rocks the lever 26, which moves the bar 23, said bar actuating the locating arm by a wedging action. It should be noted further that the piston 7 and its cylinder are of smaller bore than the other piston and cylinder, so that they operate ahead of the chucking jaw operating parts.

The chucking jaw elements of my device consist of a pair of heavy partial discs 34, which rest in semi-circular recesses 35 in the chuck head 1a. The jaws are pivoted at 36, and their peripheries are curved on the pivots as a center, and engage as a bearing in the recesses 35. Springs 37 mounted in the chuck head and secured to the discs 34, tend to hold the discs in non-engaging position with the work. Non-engaging position is indicated at dotted lines 38 (Fig. 1).

A pair of sliding pins 39 are mounted in the chuck head and body and have ends which are specially faced to engage the wedge faces 41 on the back ends of the jaw discs. There are on each pin a slanting face 40 and a succeeding more slanting face 40a, succeeded by additional bevels 42 at considerably less angles than the bevels 40, 40a, so that when the pins are advanced they first quickly wedge the jaws against the work and then the faces 42 come into engagement to provide the final tight contact. The wedge faces or bevels are curved so as to compensate for the arcuated movement of the jaws.

As will be noted, the pins 39 are advanced by a mechanism which has an equalizing action, and while the sharper wedging angles are in play this equalizing action takes place. The lesser angled faces 42 are such, however, that a great pressure on the work itself will not result in wedging the pins away, whereas with the sharper angles, this might be possible due to the equalizer system, which is free to respond to differential pressure.

An equalizer yoke 43 is used to operate the jaw wedging pins, and is provided with circular knobs at its ends to engage the notches 44 in the pins. To mount the equalizer yoke and operate it, the outer end of the inner piston rod 9 is provided with a shoe 45; the rod and the shoe both being slotted as at 46. The yoke has a projection or lug 47 therein which extends into the slot and a pivot pin 48 holds the shoe and the yoke in pivotal relation to the end of the rod. The yoke is thus free to pivot on the piston rod and within the notches of the wedging pins, whereby its equalizing function is accomplished. The yoke is formed with a hole 49 at its central portion, said hole being larger at its outer ends, and extending through the lug, where it is tapped to receive a bolt 50. The pivot pin has a hole in it which is engaged by the tip 50a of this bolt, thus holding the pivot pin in position. A locating piece 51 in the form of a cup lies over the end of the bolt in the enlarged outer end of the hole 49, and is engaged by a spring 52, which projects it forward.

As stated, I have not illustrated an entire lathe. It will be understood that a device such as described may be used at both ends of the shaft and both operated simultaneously, which can be done without danger of twisting the shaft. The two chucks will, as is usual, have a common driver so that their relative positions remain uniform at all times.

To operate the chucks air or other fluid under pressure is admitted to and exhausted from the two piston cylinders for each chuck through ports 53 and 54, in an axial shaft, which cooperates with the usual manifold sleeve. The two cylinders are in one casting with common posts. I have shown a needle valve at 55 to vary the action of the inner cylinder, the piston of which is to advance more rapidly than the other piston, as has been noted.

The air admitted through the port shaft and its manifold supplies the pressure whereby the two pistons of the chucks are advanced or retracted serving to locate and clamp a crank shaft in place. The locating devices engage the ends of the crank shaft ahead of the jaws and continue to hold them while the jaws are being applied. The jaws being applied by an equalizer will adjust themselves.

A crank shaft is set into the chucks with its webs rotated so that the locating faces rest against the locating abutments 18, and air applied to the cylinders with the result of locating the shaft under pressure, while the main jaws are rocked or rotated into engagement. Inequalities in the crank shaft web will be allowed for by the equalizer bar.

I have designed the chuck now fully described for use with crank shaft lathes which are arranged to turn all of the pins of the shafts at once and find that it is very positive and accurate in its action. The fluid pressure may be turned on and left on throughout the operation, and if it is turned off after the wedges have been fully advanced, the grip of the jaws will not give way.

The method of forming locating faces on the webs of a shaft which is to be clamped in place by power, using clamping means for engaging the locating faces, is subject to considerable variation. It has solved a problem in connection with high capacity production of crank shafts and has enabled me to make possible the very rapid mounting of the crank shafts with an accuracy which has been entirely prearranged and with no adjustments whatever.

Having thus described my invention, what I claim as new and desire to secure by Letters Patent, is:—

1. In a chucking device for crank shafts, fluid power actuating means, wedging elements operated thereby, and a locating abutment for engaging a web of such a shaft, and movable means actuated by the wedging elements and serving to force said web against the abutment, and to clamp said web from opposite sides thereof.

2. In a chucking device, the combination of power actuated chucking jaws to engage a web of a crank shaft, of means for locating the web of said shaft comprising a rest for a journal or pin of the shaft, an abutment to engage the web of the shaft adjacent said journal or pin, and a clamping member positioned to engage said web opposite to the abutment, and power means for actuating said clamping member.

3. In a chucking device, the combination of power actuated chucking jaws to engage a web of a crank shaft, of means for locating the web of said shaft comprising a rest for a journal or pin of the shaft, an abutment to engage the web of the shaft adjacent said journal or pin, and a clamping member positioned to engage said web opposite to the abutment, and power means for actuating said clamping member, said power actuating means timed to operate in timed relation with the power actuated jaws.

4. In a chucking device, the combination of power actuated chucking jaws to engage a web of a crank shaft, of means for locating the web of said shaft comprising a rest for a journal or pin of the shaft, an abutment to engage the web of the shaft adjacent said journal or pin, and a clamping member positioned to engage said web opposite to the abutment, and power means for actuating said clamping member, said power actuating means being separate from the operator of the jaws.

5. In a chucking device, the combination of power actuated chucking jaws to engage a web of a crank shaft, of means for locating the web of said shaft comprising a rest for a journal or pin of the shaft, an abutment to engage the web of the shaft adjacent said journal or pin, and a clamping member positioned to engage said web opposite to the abutment, and power means for actuating said clamping member, said power actuating means comprising a pressure driven piston and rod, a pivoted member rocked thereby, and a wedging bar moved by the pivoted member and engaging the clamping member.

6. In a chucking device, a chuck head, circular recesses therein at opposite sides of an opening to receive the work, jaws pivotally mounted and having circular edges which engage the recesses as a journal, and means for positively moving said jaws on their pivots.

7. In a chucking device, a chuck head, circular recesses therein at opposite sides of an opening to receive the work, jaws pivotally mounted and having circular edges which engage the recesses as a journal, and means for positively moving said jaws on their pivots, said means comprising wedge members slidably engaging the jaws, and power means for operating the wedge members.

8. In a chucking device, a chuck head, circular recesses therein at opposite sides of an opening to receive the work, jaws pivotally mounted and having circular edges which engage the recesses as a journal, and means for pivotally moving said jaws, said means comprising wedge members slidably engaging the jaws, and power means for operating the wedge members including an equalizer bar.

9. In a chucking device, the combination of jaws movable into and out of position to engage the work, of power means including an equalizer element, wedging pins to actuate the jaws, said pins driven by the equalizer element, the wedge faces of the pins having a primary sharp incline and a terminating or final incline at a lesser angle.

10. In a chucking device, the combination of a frame, of pivoted jaws in said frame for engaging the work, power means including an equalizer element, wedging pins to actuate the jaws, said pins driven by the equalizer element, the wedge faces of the pins formed on an arc and having a primary sharp incline and a terminating or final incline at a lesser angle.

11. In a chucking device, a chuck head, circular recesses therein at opposite sides of the opening to receive the work, jaws pivotally mounted and having circular edges which engage the recesses as a journal, and means within the chuck acting directly on the jaws, positively moving said jaws on their pivots.

12. In a chucking device for crank shafts, locating abutments, one fixed and another movable to and from the one, a wedge having an operative movement for moving said other abutment toward the one abutment, and means for applying fluid under pressure to cause said operative movement of said wedge.

13. In a chucking device for chank shafts, sets of locating abutments, one fixed and another movable to and from the one, in each set, wedges having operative movements for moving said other abutment toward the one abutment in the respective sets, and means for applying fluid under pressure to cause said operative movements of said wedges.

14. In a chucking device for crank shafts, sets of locating abutments, one fixed and another movable to and from the one, in each set, wedges having operative movements for moving said other abutment toward the one abutment in the respective sets, and means for applying fluid under pressure to cause said operative movement of each wedge, whereby one movable abutment is moved in advance of another.

WILLIAM F. GROENE.